United States Patent
Moechnig et al.

(10) Patent No.: US 11,511,824 B2
(45) Date of Patent: Nov. 29, 2022

(54) IN-TUBE CAVITY AND STORAGE

(71) Applicant: Trek Bicycle Corporation, Waterloo, WI (US)

(72) Inventors: Steven Moechnig, Madison, WI (US); Reggie Lund, Madison, WI (US); Matthew Yerke, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 848 days.

(21) Appl. No.: 16/401,211

(22) Filed: May 2, 2019

(65) Prior Publication Data
US 2020/0346708 A1     Nov. 5, 2020

(51) Int. Cl.
| *B62K 19/46* | (2006.01) |
| *B62K 19/06* | (2006.01) |
| *B62K 19/30* | (2006.01) |
| *B62J 9/40* | (2020.01) |
| *B62J 9/30* | (2020.01) |
| *B62K 3/02* | (2006.01) |

(52) U.S. Cl.
CPC .............. *B62K 19/46* (2013.01); *B62J 9/30* (2020.02); *B62J 9/40* (2020.02); *B62K 19/06* (2013.01); *B62K 19/30* (2013.01); *B62K 3/02* (2013.01)

(58) Field of Classification Search
CPC . B62J 9/40; B62K 19/06; B62K 19/30; B62K 19/40
See application file for complete search history.

(56) References Cited

U.S. PATENT DOCUMENTS

| 2,011,016 | A | | 8/1935 | Schwinn |
| 5,328,194 | A | | 7/1994 | Buckler |
| 6,070,897 | A | * | 6/2000 | Hsieh .................. B62J 9/40 74/564 |
| 6,851,499 | B2 | | 2/2005 | Yagisawa et al. |

(Continued)

FOREIGN PATENT DOCUMENTS

| CN | 2608403 Y | 3/2004 |
| CN | 201105785 Y | 8/2008 |

(Continued)

OTHER PUBLICATIONS

Francis Cebedo, "Tech: Specialized SWAT Door Fram Storage" Mtbr.com, https //web.archive.org/web/20150516223751/https://reviews.mtbr.com/tech-specialized-swat-door, retrieved on Aug. 31, 2020.

(Continued)

*Primary Examiner* — Tony H Winner
*Assistant Examiner* — Michael R Stabley
(74) *Attorney, Agent, or Firm* — Bell & Manning, LLC

(57) ABSTRACT

A bicycle frame includes a tube with a hollow portion. The tube has an opening that provides access to the hollow portion, and the tube also includes one or more recessed flanges adjacent to the opening. The bicycle frame also includes a cover holder configured to mount to the one or more recessed flanges adjacent to the opening in the tube. The bicycle frame further includes an in-tube storage cover that mounts to the cover holder such that at least a portion of an exterior surface of the in-tube storage cover is flush with an outer surface of the tube. The in-tube storage cover includes a lever mounted on the exterior surface of the in-tube storage cover.

20 Claims, 7 Drawing Sheets

(56) References Cited

U.S. PATENT DOCUMENTS

| | | | |
|---|---|---|---|
| 7,393,125 B1 | 7/2008 | Lai | |
| 7,934,576 B2 | 5/2011 | Munksoe | |
| 7,988,175 B2* | 8/2011 | White | B62K 19/40 |
| | | | 280/281.1 |
| 8,308,179 B2 | 11/2012 | Cote et al. | |
| 8,727,368 B1 | 5/2014 | Wrobleski | |
| 8,757,413 B1* | 6/2014 | Kephart | B62J 9/22 |
| | | | 206/804 |
| 8,881,857 B2* | 11/2014 | Binggeli | B62K 19/30 |
| | | | 180/68.5 |
| 9,580,141 B2* | 2/2017 | Talavasek | H01M 50/20 |
| 9,745,019 B2* | 8/2017 | Evensen | H01M 50/20 |
| D797,610 S | 9/2017 | Jankura | |
| 9,950,602 B2* | 4/2018 | Duan | H01M 50/20 |
| 9,969,455 B2* | 5/2018 | Kwag | B62K 11/02 |
| 10,197,049 B2* | 2/2019 | Staples | B62J 11/02 |
| 10,351,013 B2* | 7/2019 | Shieh | B62M 6/90 |
| 10,427,742 B2* | 10/2019 | Osada | B62K 19/40 |
| 10,518,841 B2* | 12/2019 | Talavasek | B62K 19/34 |
| 11,072,385 B2* | 7/2021 | Munksø | B62K 19/40 |
| 11,325,678 B2* | 5/2022 | Wecker | B62J 43/13 |
| 2010/0175939 A1 | 7/2010 | Cheng | |
| 2012/0000313 A1 | 1/2012 | Zacks | |
| 2012/0261897 A1 | 10/2012 | Cote et al. | |
| 2012/0313344 A1* | 12/2012 | Dal Pozzo | B62K 19/30 |
| | | | 280/288.4 |
| 2013/0241174 A1 | 9/2013 | Meyer et al. | |
| 2013/0307246 A1 | 11/2013 | Jankura et al. | |
| 2016/0090143 A1 | 3/2016 | Yamamoto | |
| 2017/0292507 A1 | 10/2017 | Staples | |

FOREIGN PATENT DOCUMENTS

| | | |
|---|---|---|
| CN | 202320650 U | 7/2012 |
| CN | 203064129 U | 7/2013 |
| CN | 106005183 A | 10/2016 |
| CN | 206938975 U | 1/2018 |
| CN | 207389428 U | 5/2018 |
| FR | 1 001 399 | 2/1952 |
| GB | 2561012 | 10/2018 |
| WO | WO2015/022554 | 2/2015 |

OTHER PUBLICATIONS

Mat Brett: "Wow! Diamondback reveals the fastest triathlon bike in the world" road.cc, Sep. 15, 2016.
Extended European Search Report issued on 20172613.0, dated Sep. 9, 2020.
P5X-Modelle Cervelo—lever, http://www.velomenal.ch/cervelo/c-_o-_r-_und_s-modelle/p-modelle, publication date Sep. 5, 2017.
P5X of Cervelo—Model 2017 manual, published Jan. 24, 2017.
Felt 1Ax: A user friendly tri bike with cutting edge aerodynamics, Andre Cheuk, Jul. 16, 2015, Bike Gear.
The Felt 1A FRD up close, Slowtwitch.com, published Feb. 19, 2014.
Third Party Observations issued on EP20172613.0, dated Apr. 20, 2022.

* cited by examiner

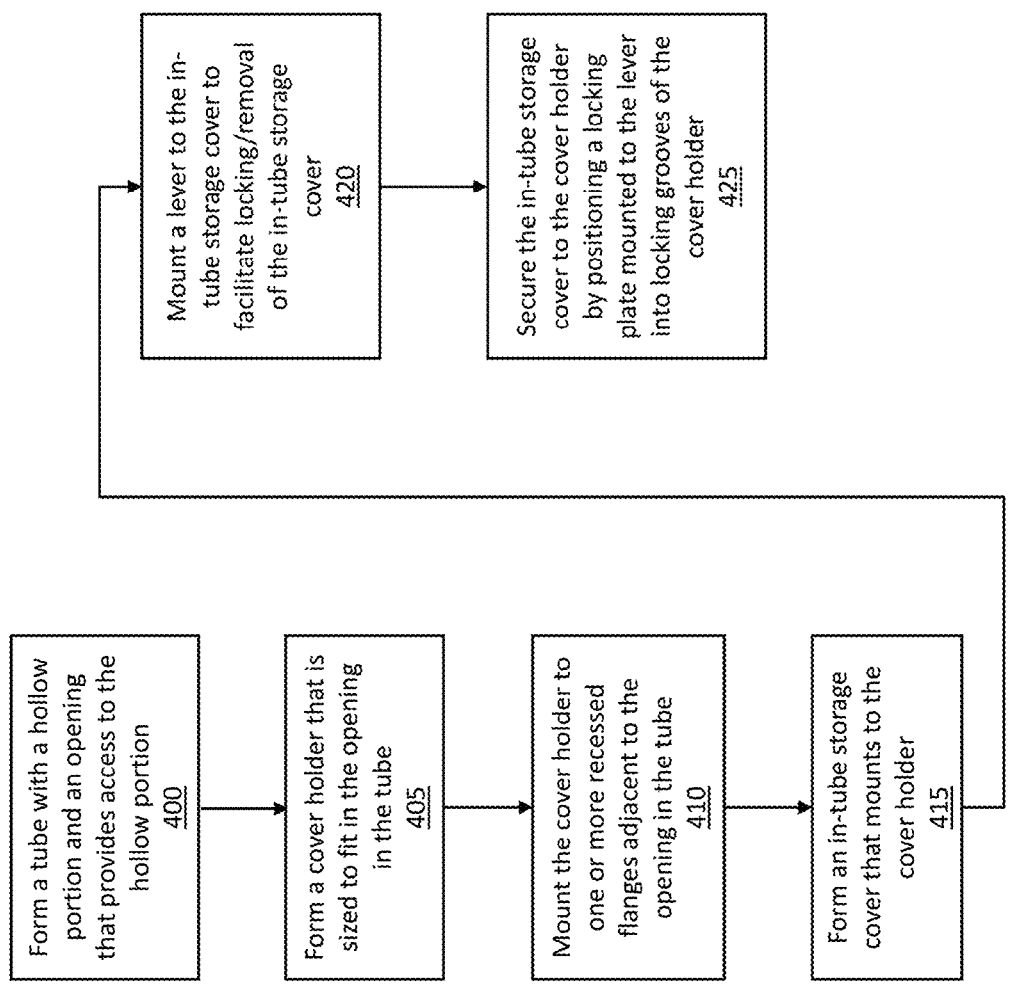

IN-TUBE CAVITY AND STORAGE

BACKGROUND

Each year, more and more individuals are turning to bicycling as a primary or secondary mode of transportation. This is due to a variety of reasons, including increased awareness regarding the importance of exercise, environmental concerns, cost concerns, etc. Recreational and professional cyclists often have a need to carry items along with them while they are cycling. For example, cyclists may carry bicycle hydration systems, bicycle tools, spare parts, extra clothes, food, camping gear, electronic devices, etc. Many bicycles includes storage systems and receptacles to carry these items. Such storage systems include bicycle racks, beverage bottle cages, baskets, bags, and other receptacles that are mounted on an external surface of the bicycle.

SUMMARY

An illustrative bicycle frame includes a tube with a hollow portion. The tube has an opening that provides access to the hollow portion, and the tube also includes one or more recessed flanges adjacent to the opening. The bicycle frame also includes a cover holder configured to mount to the one or more recessed flanges adjacent to the opening in the tube. The bicycle frame further includes an in-tube storage cover that mounts to the cover holder such that at least a portion of an exterior surface of the in-tube storage cover is flush with an outer surface of the tube. The in-tube storage cover includes a lever mounted on the exterior surface of the in-tube storage cover to facilitate removal and locking of the in-tube storage cover.

An illustrative method of making a bicycle frame includes forming a tube for the bicycle frame such that the tube includes a hollow portion and an opening that provides access to the hollow portion. Forming the tube also includes forming one or more recessed flanges adjacent to the opening. The method also includes forming a cover holder that is sized to fit in the opening in the tube. The method also includes mounting the cover holder to the one or more recessed flanges adjacent to the opening in the tube. The method also includes forming an in-tube storage cover that mounts to the cover holder such that at least a portion of an exterior surface of the in-tube storage cover is flush with an outer surface of the tube. The method further includes mounting a lever on the exterior surface of the in-tube storage cover to facilitate locking and removal of the in-tube storage cover.

Another illustrative bicycle frame includes a tube with a hollow portion, where the tube includes an opening that provides access to the hollow portion, and where the tube also includes one or more recessed flanges adjacent to the opening. A cover holder is configured to mount to the one or more recessed flanges adjacent to the opening in the tube, and the cover holder includes one or more locking slots. An in-tube storage cover mounts to the cover holder such that at least a portion of an exterior surface of the in-tube storage cover is flush with an outer surface of the tube. A locking plate mounts to a post that extends through the in-tube storage cover, where the locking plate includes one or more edges that mate with the one or more locking slots in the cover holder to secure the in-tube storage cover to the tube.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 is a flow diagram depicting operations performed to make a bicycle frame in accordance with an illustrative embodiment.

DETAILED DESCRIPTION

Traditional bicycle storage is often in the form of externally mounted storage systems such as racks, bags, cages, baskets, etc. These externally mounted storage systems are designed to hold/support water bottles, bicycle tools, spare bicycle parts, clothes, food, and other gear that cyclists wish to carry while cycling. In addition to adding weight to the bicycle, such externally mounted storage systems often result in stored items being exposed to environmental conditions such as rain, mud, dust, etc. Additionally, externally mounted storage systems can cause additional air drag, which adversely affects the aerodynamic properties of the bicycle to which they are mounted. Described herein is a bicycle with an in-tube storage cavity. The in-tube storage cavity can be used to securely store items, while also protecting them from environmental conditions. Additionally, the in-tube storage system provides an internal storage option that does not adversely affect the aerodynamics of the bicycle.

Figure 1:
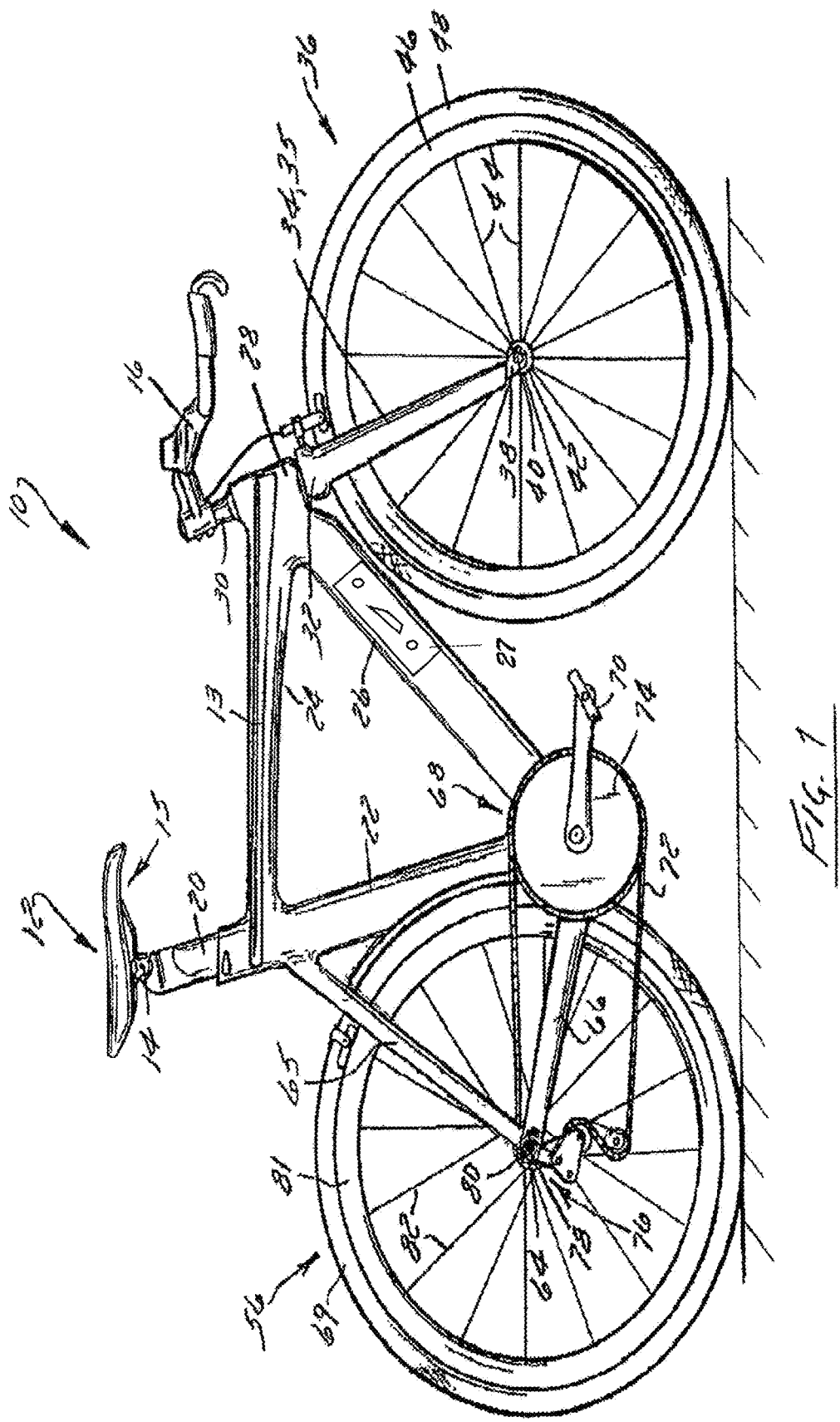
FIG. 1 depicts a bicycle with in-tube storage in accordance with an illustrative embodiment.

FIG. 1 depicts a bicycle 10 with in-tube storage in accordance with an illustrative embodiment. The bicycle 10 includes a frame 13 to which a seat assembly 12 and handlebars 16 are attached. A seat clamp 14 is engaged with an underside 15 of seat assembly 12 and cooperates with a seat post 20 that slidably engages a seat tube 22 of frame 13. A top tube 24 and a down tube 26 extend forwardly from seat tube 22 to a head tube 28 of frame 13. As shown, an in-tube storage cover 27 is positioned on a side wall of the down tube 26. As described in more detail below, the in-tube storage cover 27 provides access to a storage cavity within the down tube 26. In alternative embodiments, the in-tube storage cover 27 can be positioned on a different portion of the down tube 26, such as a top side of the down tube 26, a bottom side of the down tube 26, or the opposite side wall of the down tube 26.

Handlebars 16 of the bicycle 10 are connected to a steerer tube 30 that passes through head tube 28 and engages a fork crown 32. A pair of fork blades 34, 35 extend from generally opposite ends of fork crown 32 and are constructed to support a front wheel assembly 36 at an end thereof or fork tip 38. The fork blades 34, 35 can be part of a suspension bicycle fork or a rigid bicycle fork. As also shown in FIG. 1, fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. The crankset 68 includes pedals 70 that are operationally connected to a flexible drive such as a chain 72 via a chain ring or sprocket 74. Rotation of the chain 72 communicates a drive force to a rear section 76 of the bicycle 10 having a gear cluster 78 positioned thereat. The gear cluster 78 is generally concentrically orientated with respect to the rear axle 64 and includes a number of variable diameter gears. The gear cluster 78 is operationally connected to a hub 80 associated with a rear tire 69 of rear wheel assembly 56. A number of spokes 82 extend radially between the hub 80 and a rim 81 that supports tire 69 of rear wheel assembly 56. As is commonly understood, rider operation of the pedals 70 drives the chain 72 thereby driving the rear tire 69 which in turn propels the bicycle 10.

Figure 2A:
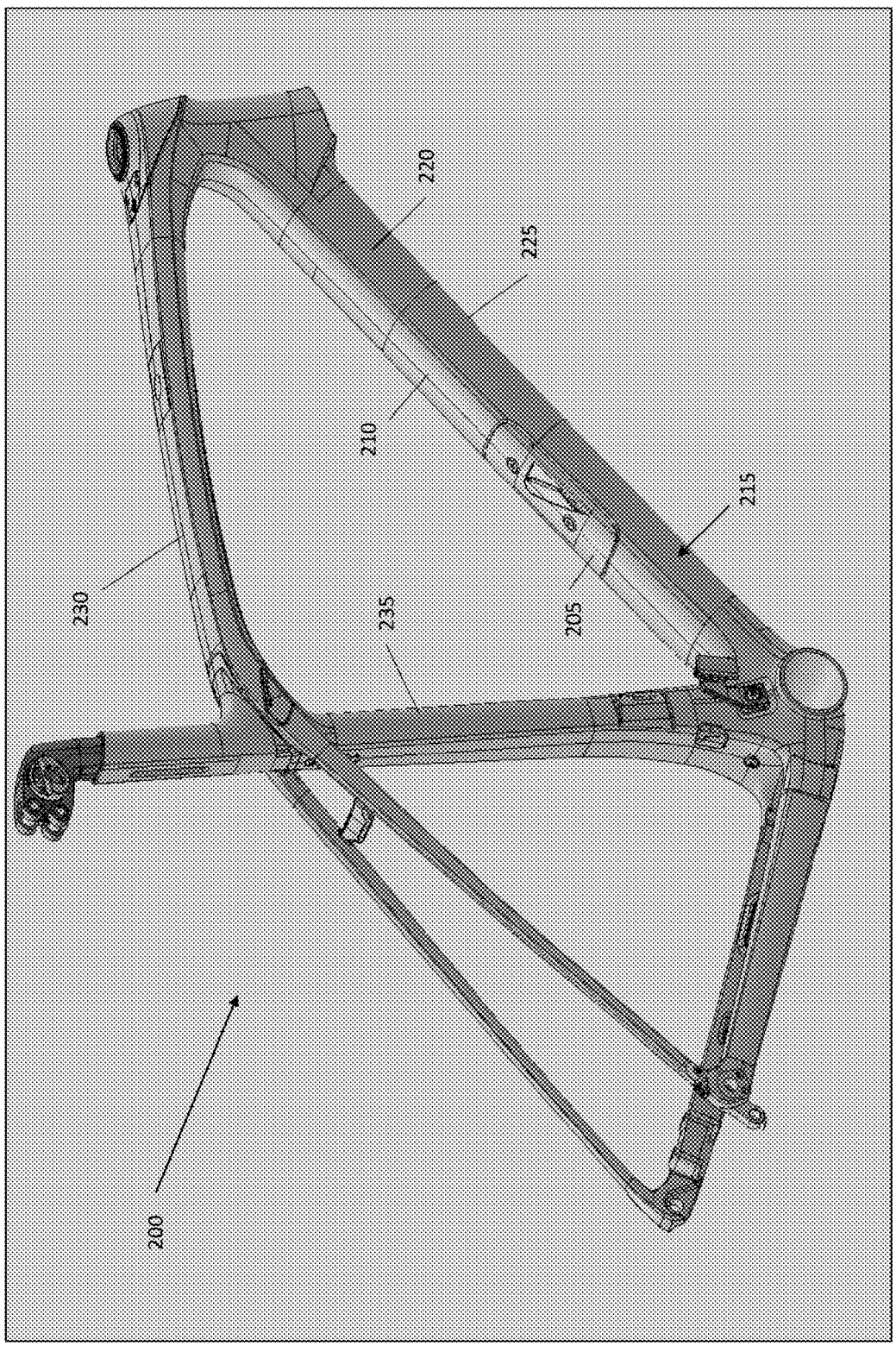
FIG. 2A depicts a bicycle frame with in-tube storage in accordance with an illustrative embodiment.

FIG. 2A depicts a bicycle frame 200 with in-tube storage in accordance with an illustrative embodiment. An in-tube storage cover 205 is shown positioned on a top side 210 of a down tube 215 of the bicycle frame. The in-tube storage cover 205 is used to enclose a storage cavity within the down tube 215, which is partially or completely hollow to facilitate the in-tube storage. In alternative embodiments, the in-tube storage cover 205 can be in a different position on the top side 210 of the down tube 215. In another embodiment, the in-tube storage cover 205 can be positioned on either the left or right side wall 220 of the down tube 215, or on the bottom side 225 of the down tube 215. In yet another alternative embodiment, the in-tube storage cover 205 can be positioned over a cavity in the top tube 230 or the saddle tube 235 of the bicycle frame 200.

In an illustrative embodiment, the in-tube storage cover 205 is made of the same material (e.g., carbon fiber, aluminum, steel, etc.) as the down tube 215 and has the same appearance as the down tube 215. The in-tube storage cover 205 is also designed to be a relatively seamless continuation of the wall of the down tube 215. As a result, the in-tube storage cover is aesthetically pleasing and does not adversely affect the aerodynamic properties of the bicycle.

The in-tube storage cover 205 also forms a weathertight seal with an opening in the down tube 215 such that water and dirt is unable to enter the down tube when the in-tube storage cover 205 is in place.

While the embodiment of FIG. 2A depicts a single in-tube storage cover 205, in alternative implementations, multiple in-tube storage covers may be used. In one embodiment, the multiple in-tube storage covers can provide access to different portions of the same cavity. For example, two or more in-tube storage covers can be included to provide different areas of access to the cavity in the down tube 215. The two or more in-tube storage covers can be positioned on the same or different sides of the down tube 215, depending on the embodiment. Alternatively, each of the multiple in-tube storage covers can provide access to distinct cavities in the same frame tube, or distinct cavities in different frame tubes.

Figure 2C:
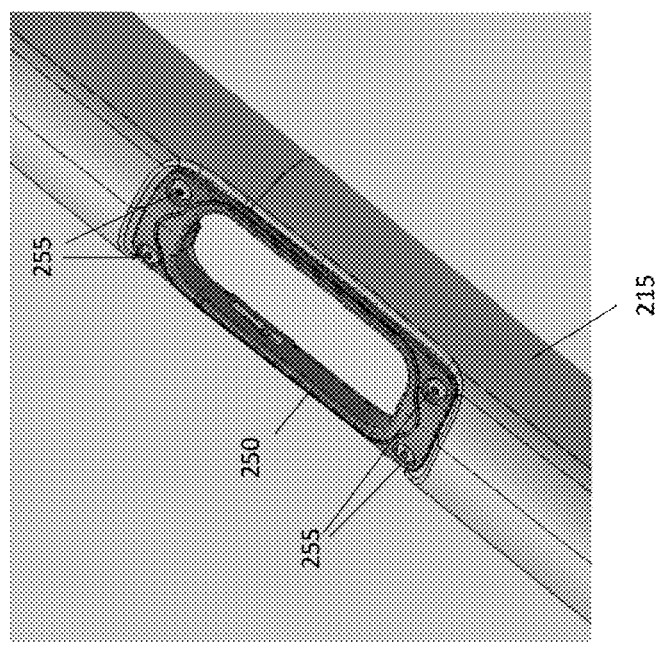
FIG. 2C is a partial view of the down tube with the in-tube storage cover removed in accordance with an illustrative embodiment.
Figure 2B:
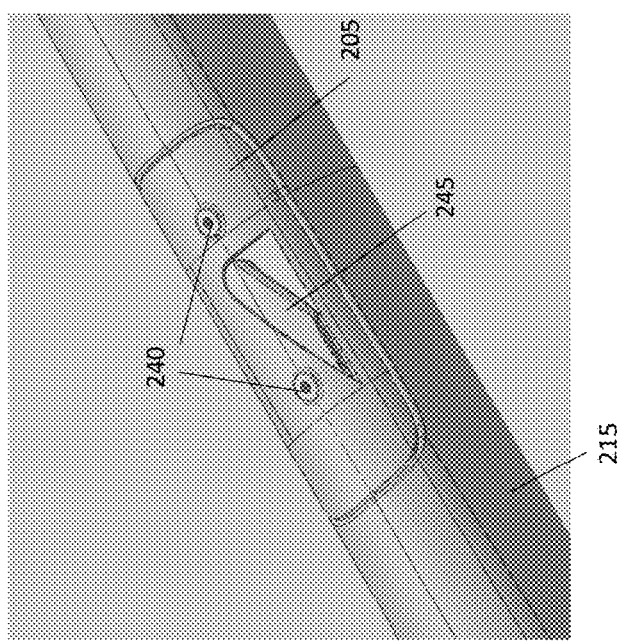
FIG. 2B is a partial view of the down tube of FIG. 2A, depicting an in-tube storage cover in accordance with an illustrative embodiment.

FIG. 2B is a partial view of the down tube 215, depicting the in-tube storage cover 205 in accordance with an illustrative embodiment. The in-tube storage cover 205 includes a pair of inserts 240. In an illustrative embodiment, the inserts 240 are threaded openings configured to receive a threaded fastener (e.g., bolt or screw) such that an accessory can be attached to the in-tube storage cover 205. As one example, the inserts 240 can be used to mount a water bottle cage/holder to the external surface of the in-tube storage cover 205. Also depicted in FIG. 2B is a lever 245 positioned in between the inserts 240. The lever 245 is used to detach the in-tube storage cover 205 from the down tube 215 such that a user is able to access the cavity in the down tube 215. As discussed in more detail below, the lever 245 is also used to re-secure the in-tube storage cover 205 to the down tube 215.

FIG. 2C is a partial view of the down tube 215 with the in-tube storage cover removed in accordance with an illustrative embodiment. Surrounding an opening in the down tube 215 is a cover holder 250 that is configured to receive the in-tube storage cover 205. The cover holder 250 is mounted in the opening in the down tube 215 with fasteners 255, which can be bolts, screws, rivets, etc. Specifically, the down tube 215 includes one or more flanges that are recessed relative to an exterior surface of the down tube 215. The recessed flange(s), which include holes to receive the fasteners 255, are recessed a distance that allows mounting of the cover holder 250 and the in-tube storage cover 205 such that an exterior surface of the in-tube storage cover 205 is flush with the exterior surface of the down tube 215. The cover holder 250 is described in more detail with reference to FIG. 3A.

Figure 3B:
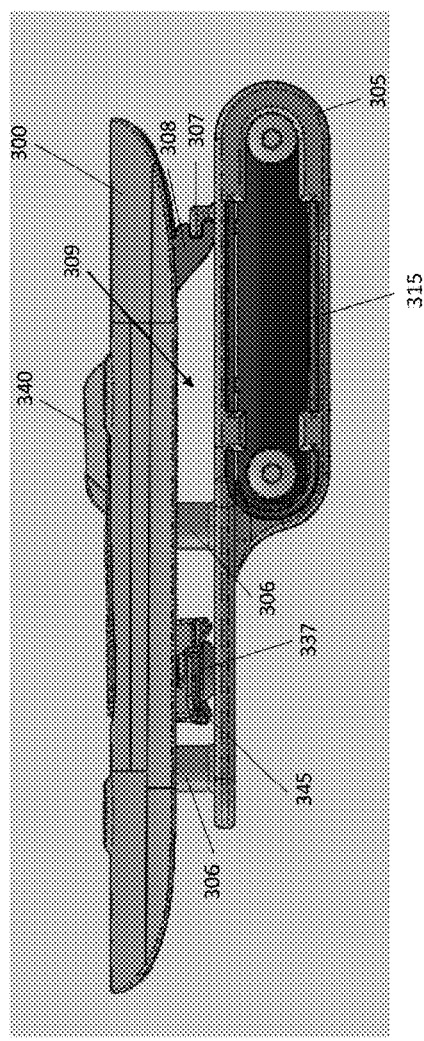
FIG. 3B is a side view of the in-tube storage cover and the tool holder of FIG. 3A in accordance with an illustrative embodiment.
Figure 3A:
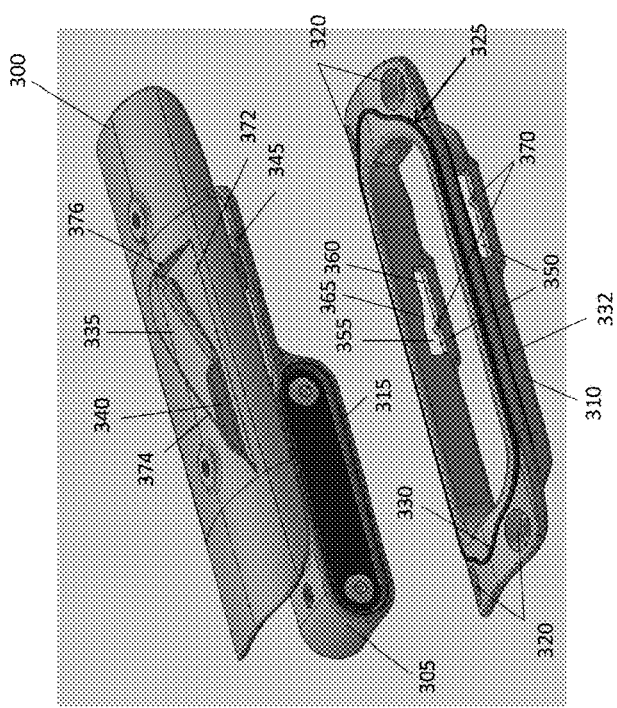
FIG. 3A depicts an in-tube storage cover with a tool holder, and a cover holder in accordance with an illustrative embodiment.
Figure 3D:
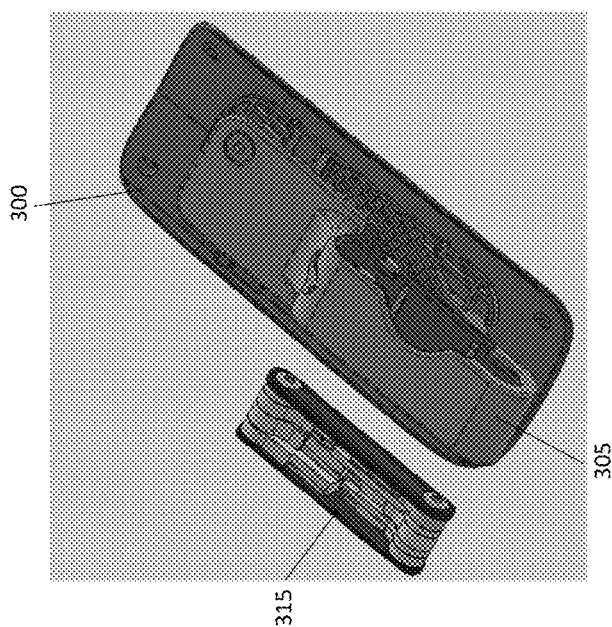
FIG. 3D is a bottom perspective view of the in-tube storage cover with a tool removed from the tool holder in accordance with an illustrative embodiment.
Figure 3C:
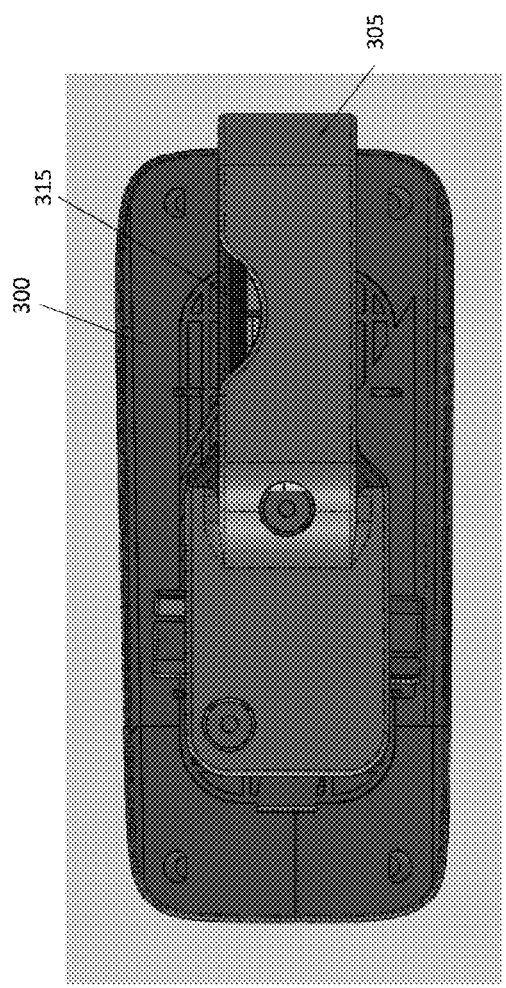
FIG. 3C is a bottom view of the in-tube storage cover and the tool holder in accordance with an illustrative embodiment.
Figure 3F:
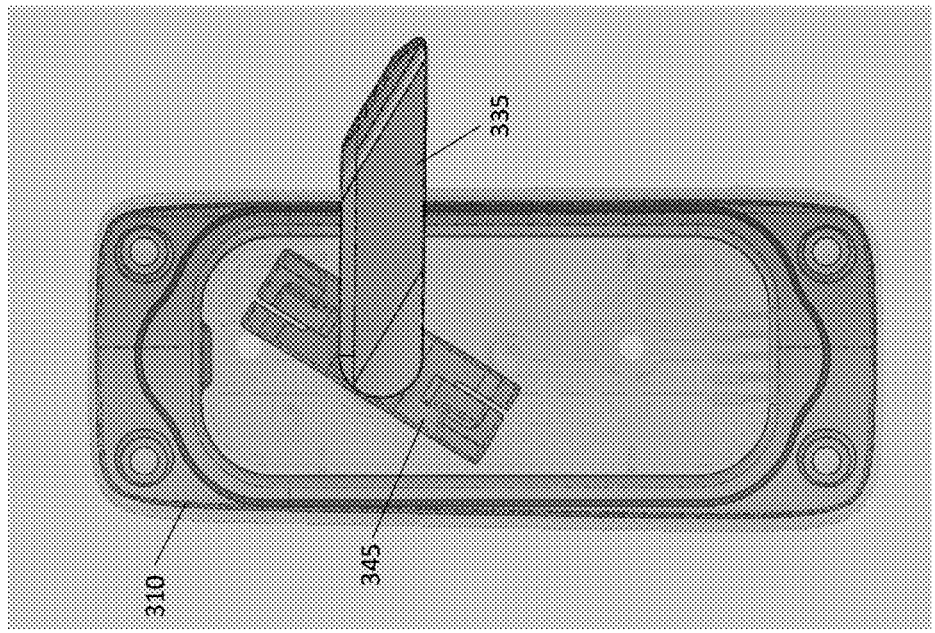
FIG. 3F is a partial view depicting the locking mechanism of the in-tube storage cover in an unlocked position in accordance with an illustrative embodiment.
Figure 3E:
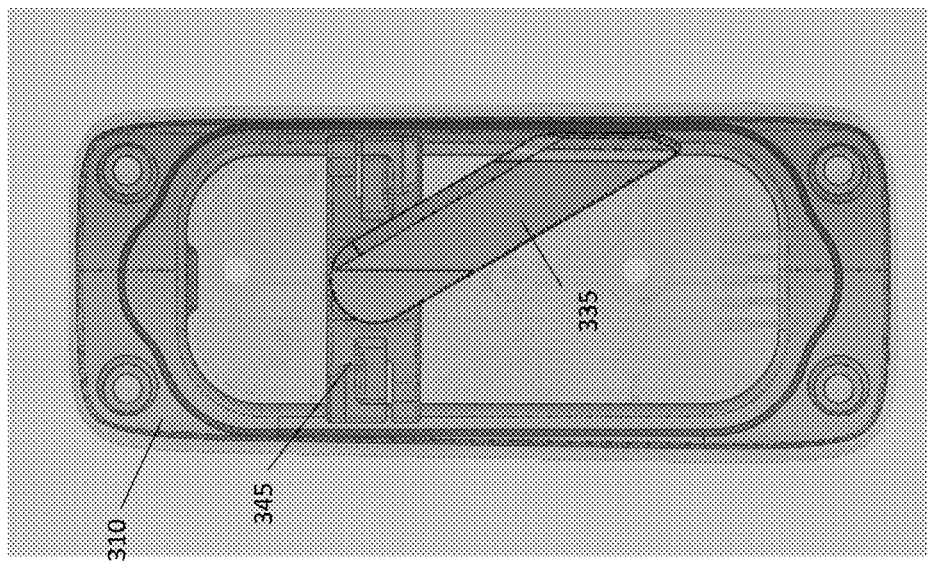
FIG. 3E is a partial view depicting the locking mechanism of the in-tube storage cover in a locked position in accordance with an illustrative embodiment.
Figure 2A:
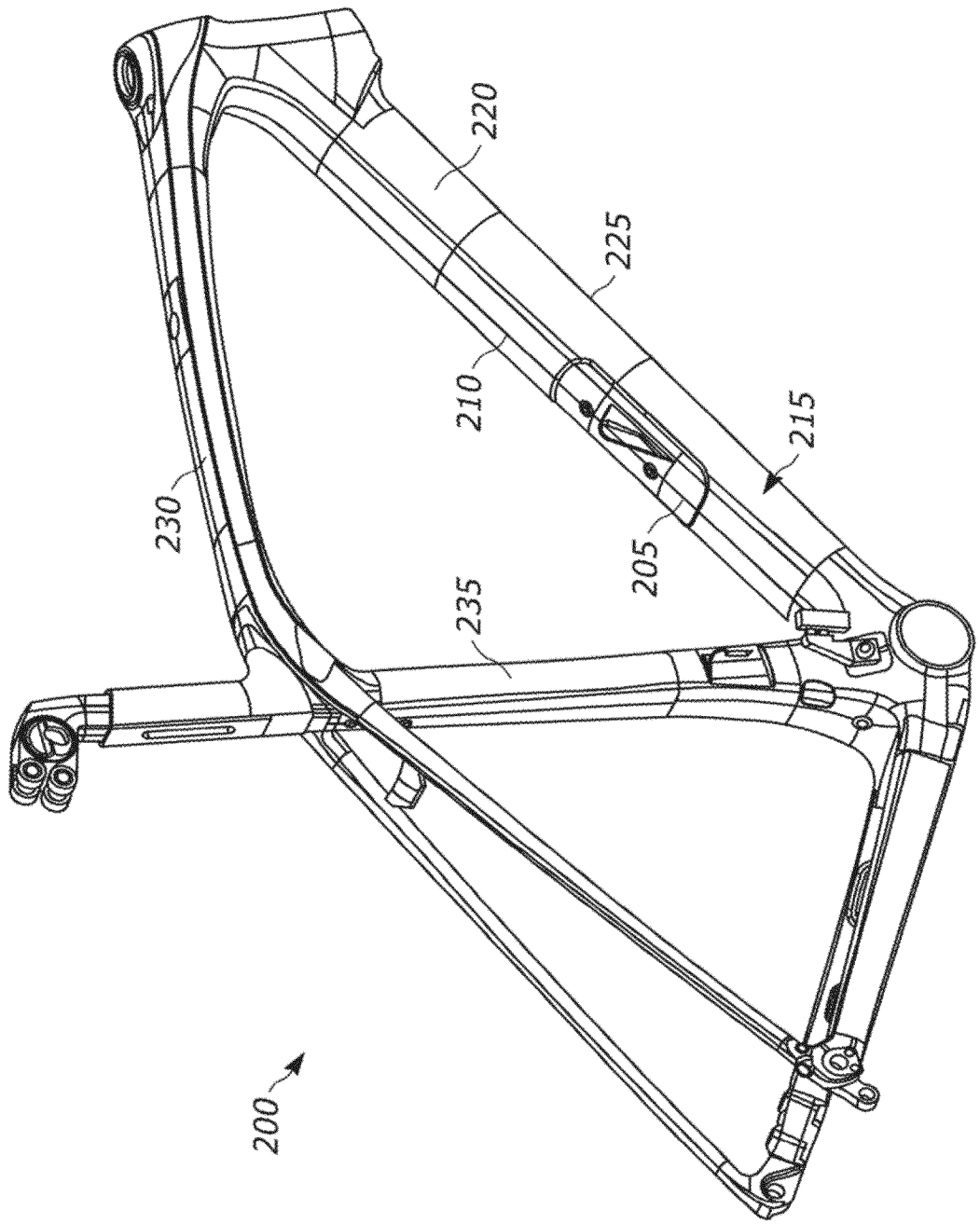
Figure 2B:
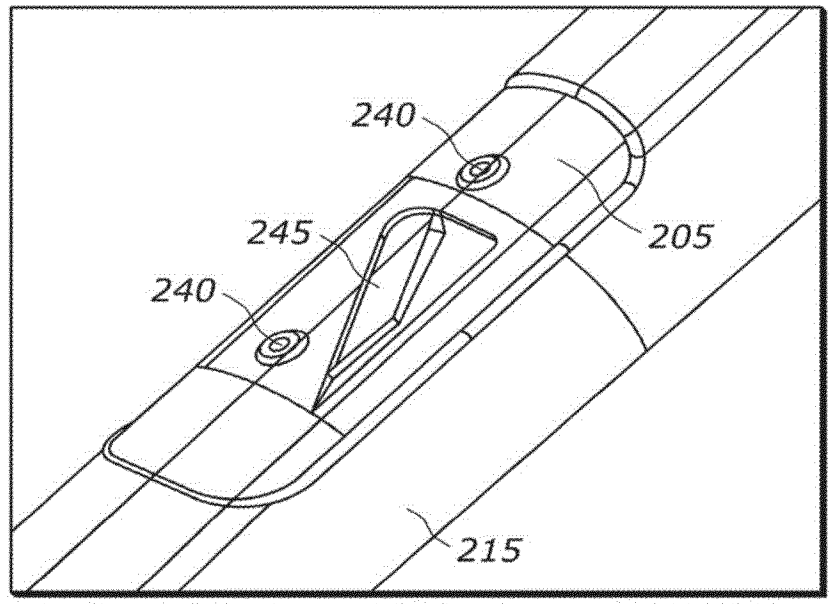
Figure 2C:
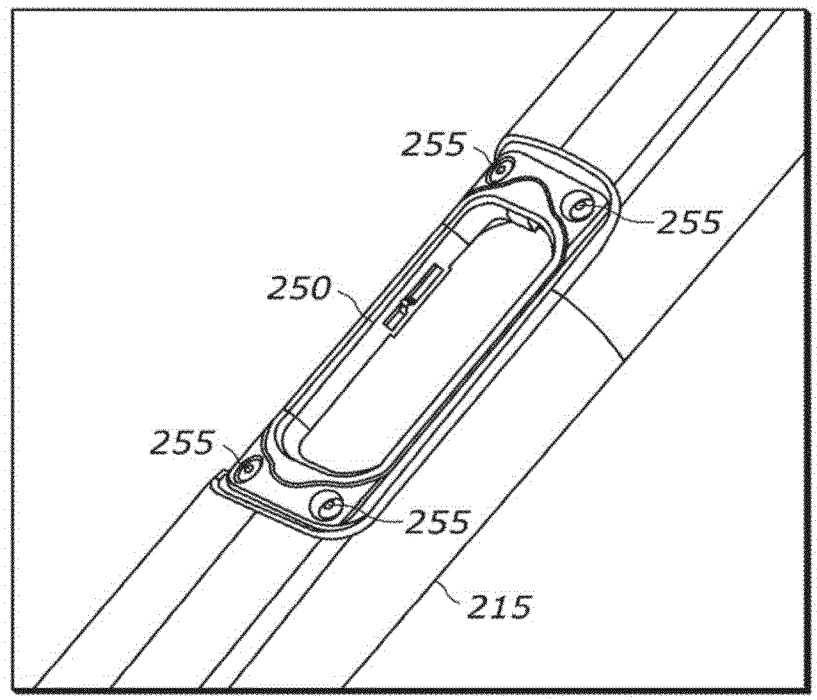
Figure 3A:
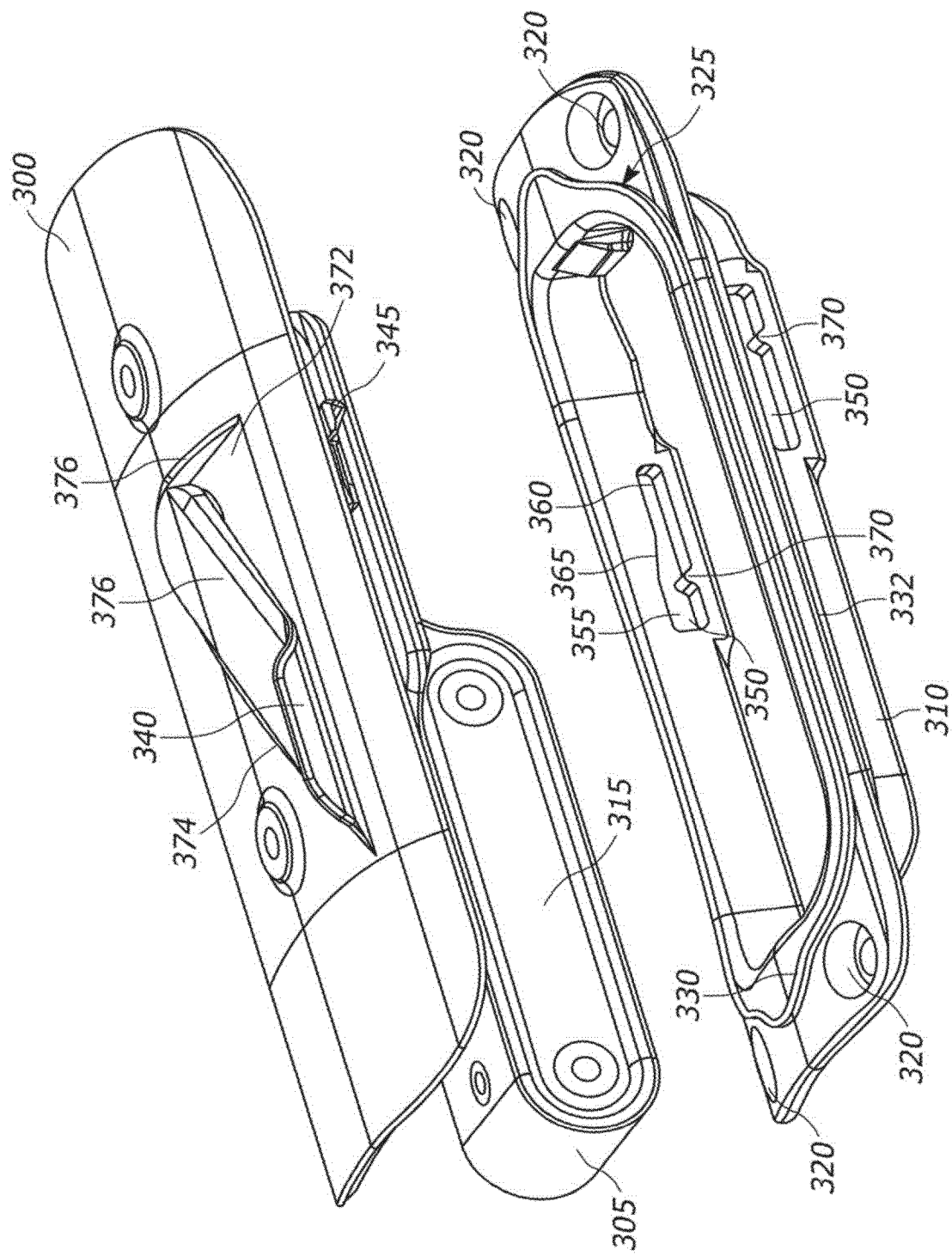
Figure 3B:
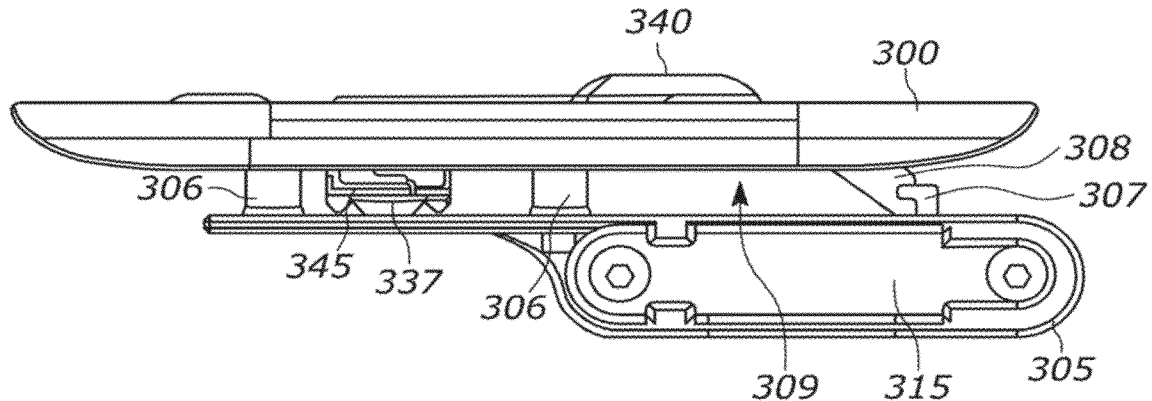
Figure 3C:
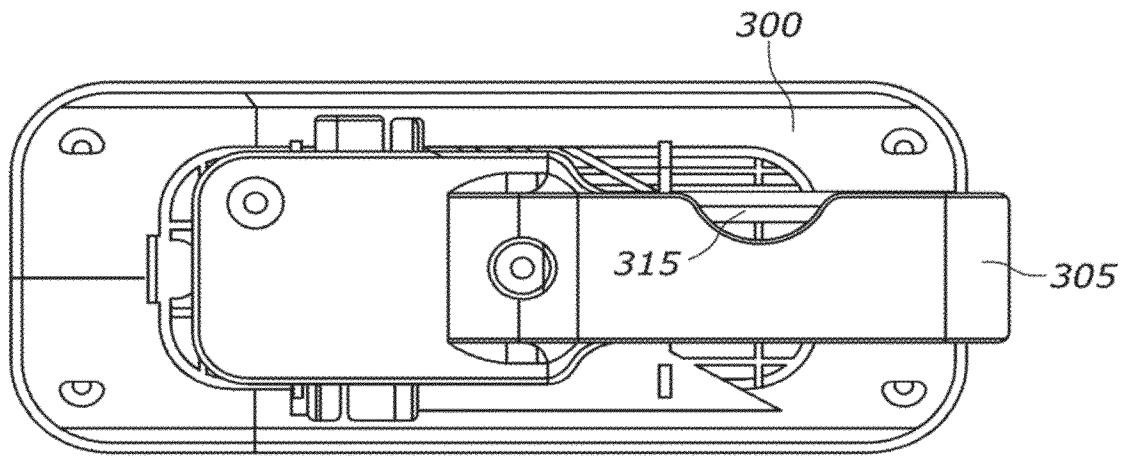
Figure 3D:
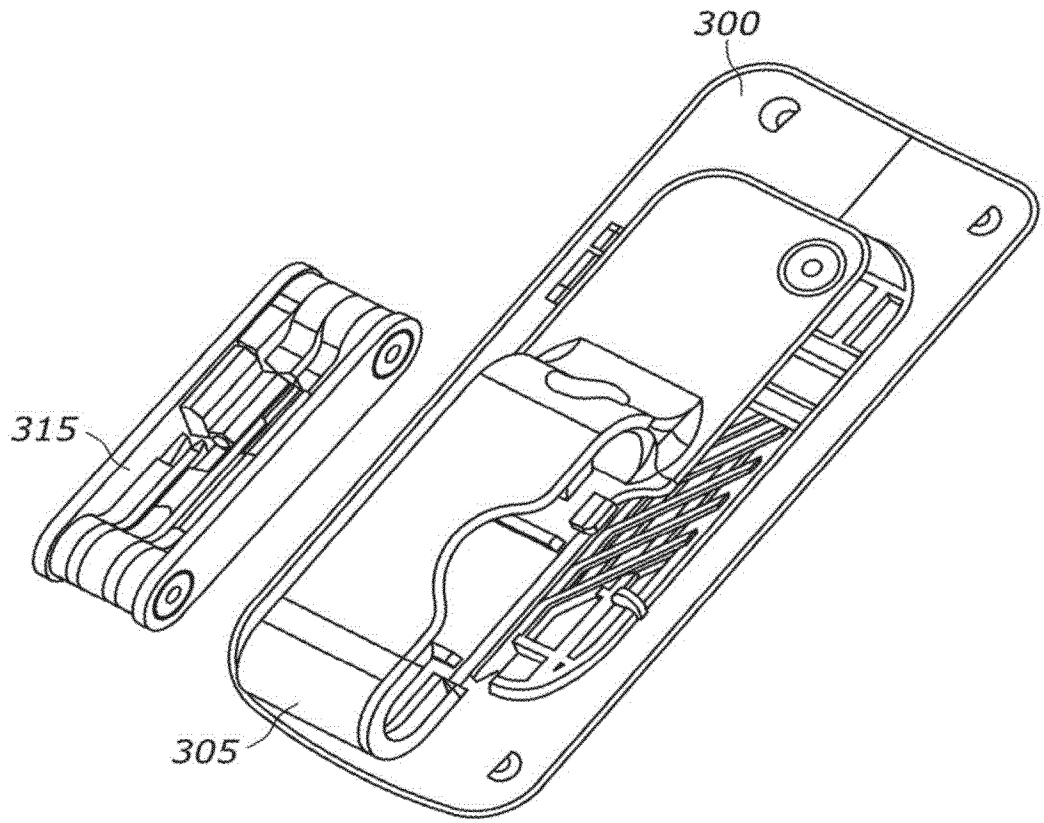
Figure 3F:
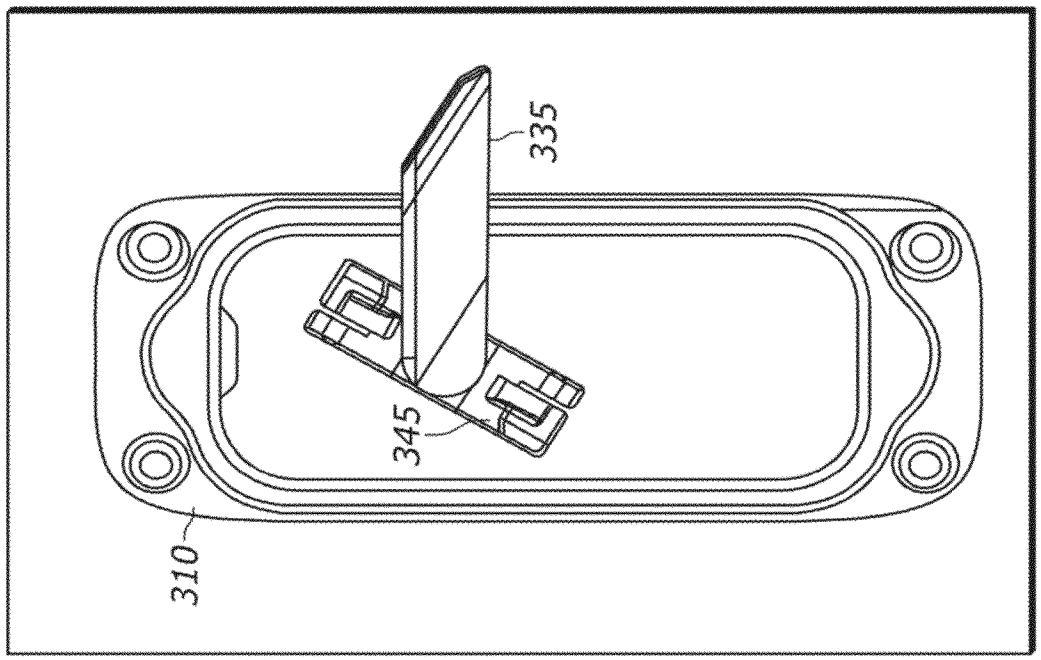
Figure 3E:
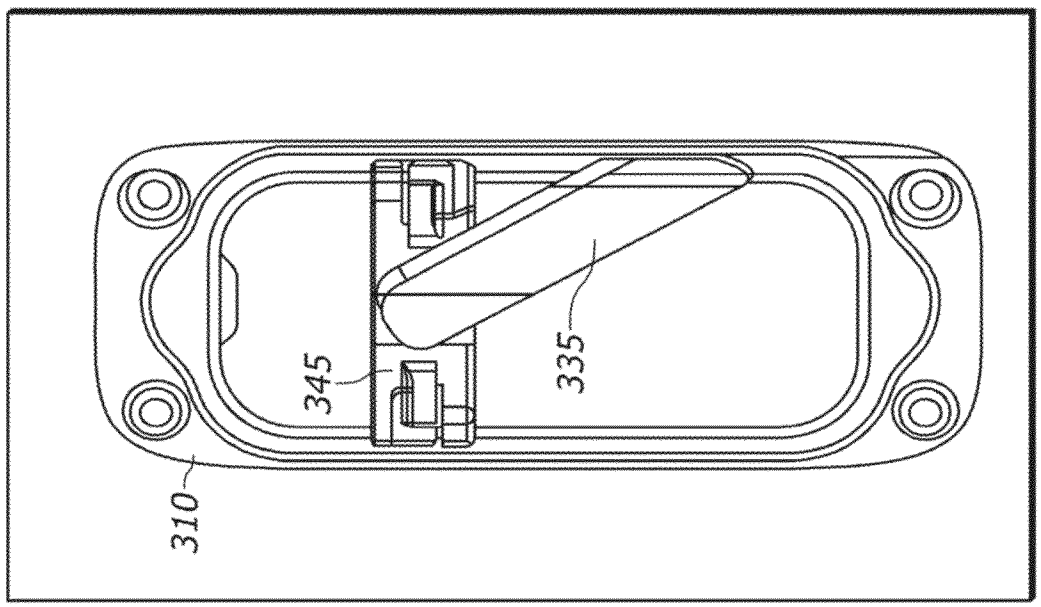

FIG. 3A depicts an in-tube storage cover 300 with a tool holder 305, and a cover holder 310 in accordance with an illustrative embodiment. FIG. 3B is a side view of the in-tube storage cover 300 and the tool holder 305 in accordance with an illustrative embodiment. FIG. 3C is a bottom view of the in-tube storage cover 300 and the tool holder 305 in accordance with an illustrative embodiment. FIG. 3D is a bottom perspective view of the in-tube storage cover 300 with a tool 315 removed from the tool holder 305 in accordance with an illustrative embodiment. FIG. 3E is a partial view depicting the locking mechanism of the in-tube storage cover 300 in a locked position in accordance with an illustrative embodiment. FIG. 3F is a partial view depicting the locking mechanism of the in-tube storage cover 300 in an unlocked position in accordance with an illustrative embodiment. In the views of FIGS. 3E and 3F, portions of the in-tube storage cover are transparent to depict how the locking mechanism interacts with the cover holder 310.

As shown in FIG. 3A, the cover holder 310 includes holes 320 such that the cover holder can be mounted to one or more recessed flanges of a down tube, as described with reference to FIG. 2C. The cover holder 310 also includes a groove 325 surrounding the opening that provides access to the cavity in the down tube. The groove 325 is configured to hold a gasket 330 that rests upon an interior surface of the in-tube storage cover 300 to provide a weathertight seal. In one embodiment, the interior surface of the in-tube storage cover 300 can include a matching groove to the groove 325, where the matching groove is also configured to receive a portion of the gasket 330 to form the weathertight seal. In an alternative embodiment, the gasket 330 can be positioned on the interior surface of the in-tube storage cover 300 instead of an exterior surface of the cover holder 310. A bottom gasket 332 is also mounted to a bottom surface of the cover holder 310 to form a weathertight seal between the cover holder 310 and the opening formed in the down tube.

The in-tube storage cover 300 also includes a lever 335 that is used to detach/secure the in-tube storage cover 300 from/to the cover holder 310. As shown, the lever 335 includes a raised surface (or flange) 340 that enables a user to move the lever 335 between unlocked and locked positions, and vice versa. In the image of FIG. 3A, the lever 335 is in a locked position. When the lever 335 is in the locked position, the ends of a locking plate 345 (seen more clearly in FIGS. 3E and 3F) rest in locking grooves 350 of the cover holder 310. Each of the locking grooves 350 includes a first portion 355 and a second portion 360. An upper wall of each of the locking grooves 350 includes a tapered portion 365 that tapers down from the first portion 355 to the second portion 360. As a result, the first portion 355 is wider than the second portion 360. A bottom wall of each of the locking grooves 350 includes a locking tab 370 that helps hold lever 335 in the locked position when the in-tube storage cover 300 is secured to the cover holder 310.

As shown in FIG. 3A, an exterior surface of the in-tube storage cover includes a recess 372 with an angled stop wall 374 and an end stop wall 376. The angled stop wall 374 and the end stop wall 376 allow the lever 335 to rotate between locked and unlocked positions. Specifically, the lever 335 is primarily in contact with the angled stop wall 374 in the locked position, and primarily in contact with the end stop wall 376 in the unlocked position. The lever 335 is mounted to a post 337 (FIG. 3B) that extends through the in-tube storage cover 300. The post 337 secures the lever 335 to the in-tube storage cover 300, and also enables the lever 335 to rotate (or pivot) from the locked position to the unlocked position, and vice versa.

Referring now to FIGS. 3A, 3E, and 3F, when the lever 335 is in the locked position (i.e., FIGS. 3A and 3E), ends of the locking plate 345 are positioned in the locking grooves 350 of the cover holder 310. To mount the in-tube storage cover, the lever 335 is positioned in the unlocked position (i.e., FIG. 3F), the in-tube storage cover is positioned onto the cover holder 310, and the lever 335 is moved toward the locked position. As the lever 335 begins to move from the unlocked position to the locked position, edges of the locking plate 345 enter the (wider) first portions 355 of the locking grooves 350. As the lever 335 is moved further toward the locked position, the edges of the locking plate 345 contact the tapered portions 365 of the locking grooves 350 and are forced into the (narrower) second portions 360 of the locking grooves 350, which draws the in-tube storage cover tight to the cover holder 310, forming a weathertight seal. The locking tabs 370 maintain the edges of the locking plate 345 in the second portions 360 of the locking grooves 350 via friction. It is noted that in the view of FIG. 3E, the edges of the locking plate 345 are depicted above the inner edge of the cover holder for illustrative purposes to depict how the edges of the locking plate 345 extend past the inner edge of the cover holder 310 to provide the locking function. When the in-tube storage cover is actually mounted and in the locked position, the edges of the locking plate are positioned in the locking grooves 350 shown in FIG. 3A, and would thus not be visible in the depiction of FIG. 3E. As discussed above, an edge of the lever 335 is primarily in contact with the angled stop wall 374 when the lever 335 is in the locked position.

To remove the in-tube storage cover, sufficient force is applied to the raised surface 340 of the lever 335 to move the edges of the locking plate 345 past the locking tabs 370 and back into the first portions 355 of the locking grooves 350. Force continues to be applied until the edges of the locking plate 345 clear the locking grooves 350, at which point the in-tube storage cover can be removed. As discussed above, an edge of the lever 335 is primarily in contact with the end stop wall 376 when the lever is in the unlocked position.

As discussed above, the embodiment of FIG. 3 includes a tool holder 305 that is configured to hold a tool 315. The tool 315 can be a multi-tool that includes one or more types of tools such as Allen wrenches (or hex keys), other types of wrenches, screwdrivers, etc. The tool holder 305 is mounted to the in-tube storage cover 300 by way of posts 306 and a prong 307. The posts 306 extend from an interior surface of the in-tube storage cover 300 to an upper surface of the tool holder 305. In an illustrative embodiment, fasteners can be positioned in openings in the posts 306 to secure the tool holder 305. The prong 307 is an L-shaped prong that mates with an indentation in an angled flange 308 that extends from the interior surface of the in-tube storage cover 300. As depicted, there is a gap 309 between the interior surface of the in-tube storage cover 300 and the upper surface of the tool holder 305. This gap 309 accommodates movement of the locking plate 345, and allows the edges of the locking plate 345 to access the locking grooves 350 in the cover holder 310 as discussed above.

In alternative embodiments, the tool holder 305 can be mounted to the in-tube storage cover 300 using any other technique or configuration. Also, in an illustrative embodiment, the tool holder 305 is permanently mounted to the in-tube storage cover 300 and is not intended to be removed by the user. In another alternative embodiment, the tool holder 305 and tool 315 may not be included. In yet another embodiment, the in-tube storage cover can include a keyed or electronic lock to further secure contents of the in-tube storage cavity. The lock can be used to prevent the lever 335 from moving from the locked position into the unlocked position unless a key (or electronic signal) deactivates the lock. Specifically, the lock can be used to prevent rotation of the post 337 used to mount the lever 335 to the in-tube storage cover 300. In an embodiment with a keyed lock, a keyhole can be positioned on an external surface of the lever 335 proximate to the post 337.

FIG. 4 is a flow diagram depicting operations performed to make a bicycle frame in accordance with an illustrative embodiment. In alternative embodiments, fewer, additional, and/or different operations may be performed. Also, the use of a flow diagram is not intended to be limiting with respect to the order of operations performed. In an operation 400, a tube is formed with a hollow portion and an opening that provides access to the hollow portion. The tube can be a down tube, top tube, or saddle tube, depending on the embodiment. The opening can be made in any wall of the tube (e.g., top, bottom, or side). Forming the tube can also include forming one or more recessed flanges in the opening, as described herein. As used herein, the term 'forming' can refer to any type of manufacturing process known in the art of making bicycle frames and components.

In an operation 405, a cover holder is formed that is sized to fit in the opening in the tube. In an illustrative embodiment, the cover holder is configured to mount to the one or more recessed flanges formed in the opening of the tube. In another illustrative embodiment, forming the cover holder can include forming a pair of locking grooves in sidewalls of the cover holder, where each of the locking grooves includes a first portion, a second portion, a tapered portion that transitions from the first portion to the second portion, and a locking tab. Forming the cover holder can also include forming one or more grooves therein that are configured to receive one or more gaskets to create weathertight seals between the cover holder and an in-tube storage cover, and between the cover holder and the one or more recessed flanges in the opening of the tube. Forming the cover holder can also include forming openings configured to receive fasteners such that the cover holder can be mounted to the tube.

In an operation 410, the cover holder is mounted to the one or more recessed flanges adjacent to the opening in the tube. Mounting the cover holder can include placing fasteners through the openings in the cover holder and into aligned openings in the one or more recessed flanges to secure the mounting cover.

In an operation 415, an in-tube storage cover that mounts to the cover holder is formed. Forming the in-tube storage cover can include forming one or more inserts on an exterior surface of the cover, wherein the one or more inserts are configured to receive fasteners to mount an accessory such as a water bottle holder. Forming the in-tube storage cover can also include forming a recess in the exterior surface of the cover, wherein the recess includes an angled stop wall and an end stop wall. The recess is configured to receive a lever that can be used to lock and remove the in-tube storage cover. In one embodiment, forming the in-tube storage cover can also include mounting a tool holder to the cover via one or more posts and a mating relationship between a prong on an outer surface of the tool holder and an angled flange on an interior surface of the cover. As discussed above, the tool holder can be mounted such that a gap exists between the tool holder and the in-tube storage cover.

In an operation 420, a lever is mounted to the in-tube storage cover to facilitate locking and removal of the cover to the cover holder. In an illustrative embodiment, the lever is mounted to a post that extends through the in-tube storage cover, and that connects the lever to a locking plate such that the locking plate rotates in unison with the lever. In an operation 425, the in-tube storage cover is secured to the cover holder by positioning the locking plate mounted to the lever into the locking grooves of the cover holder.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

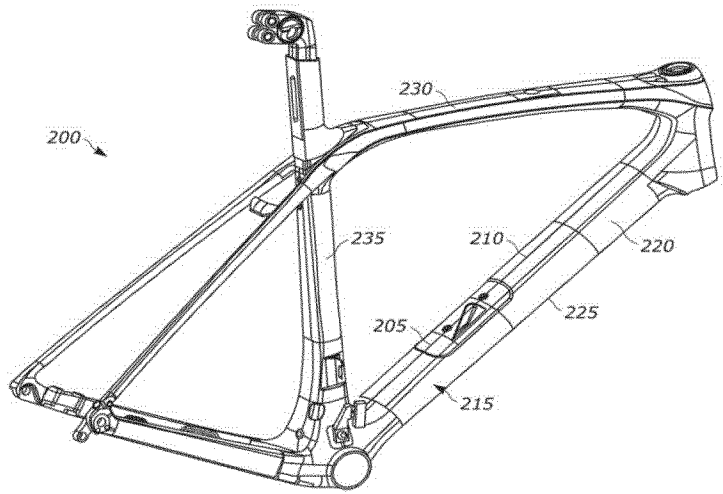

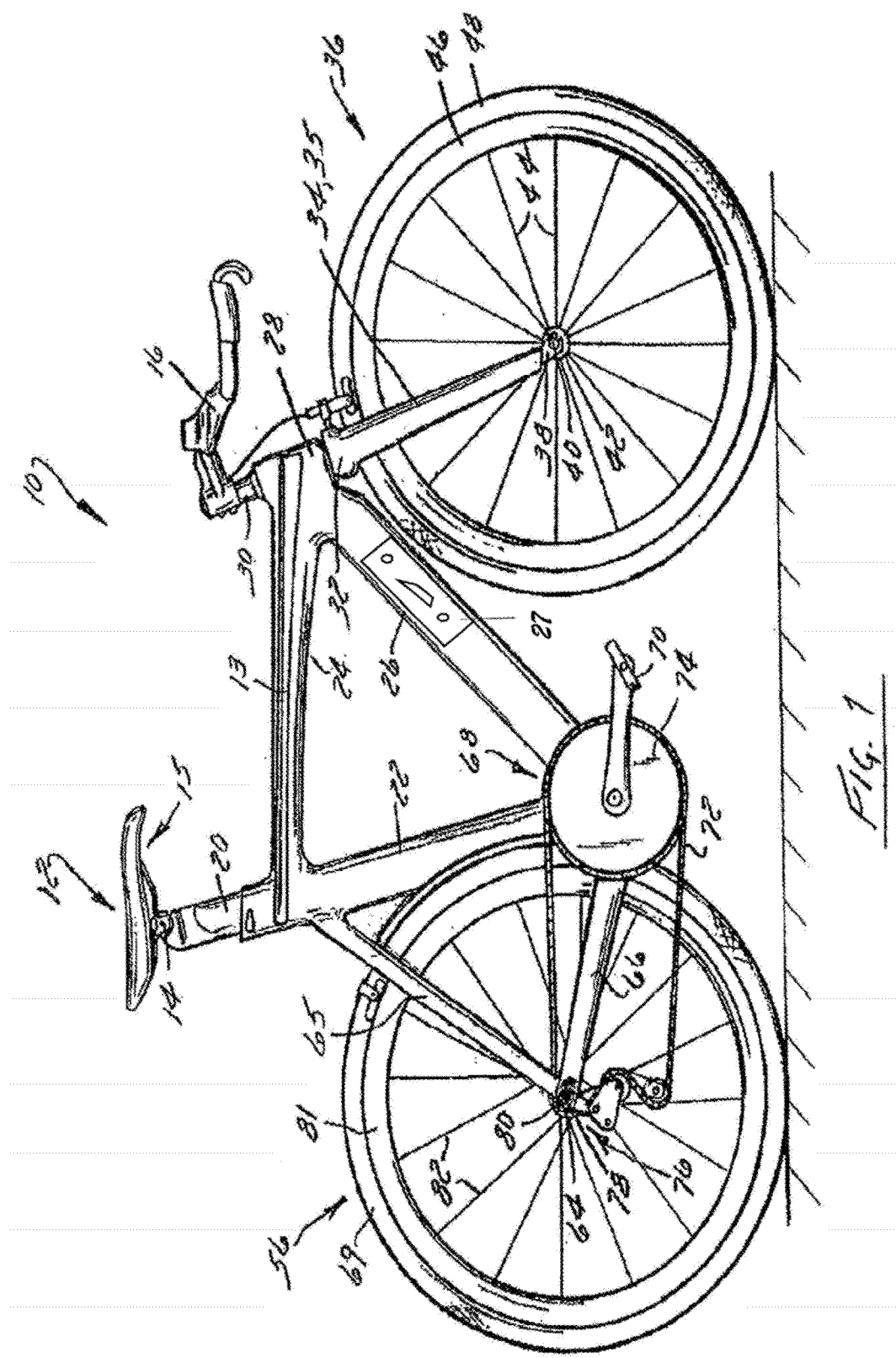

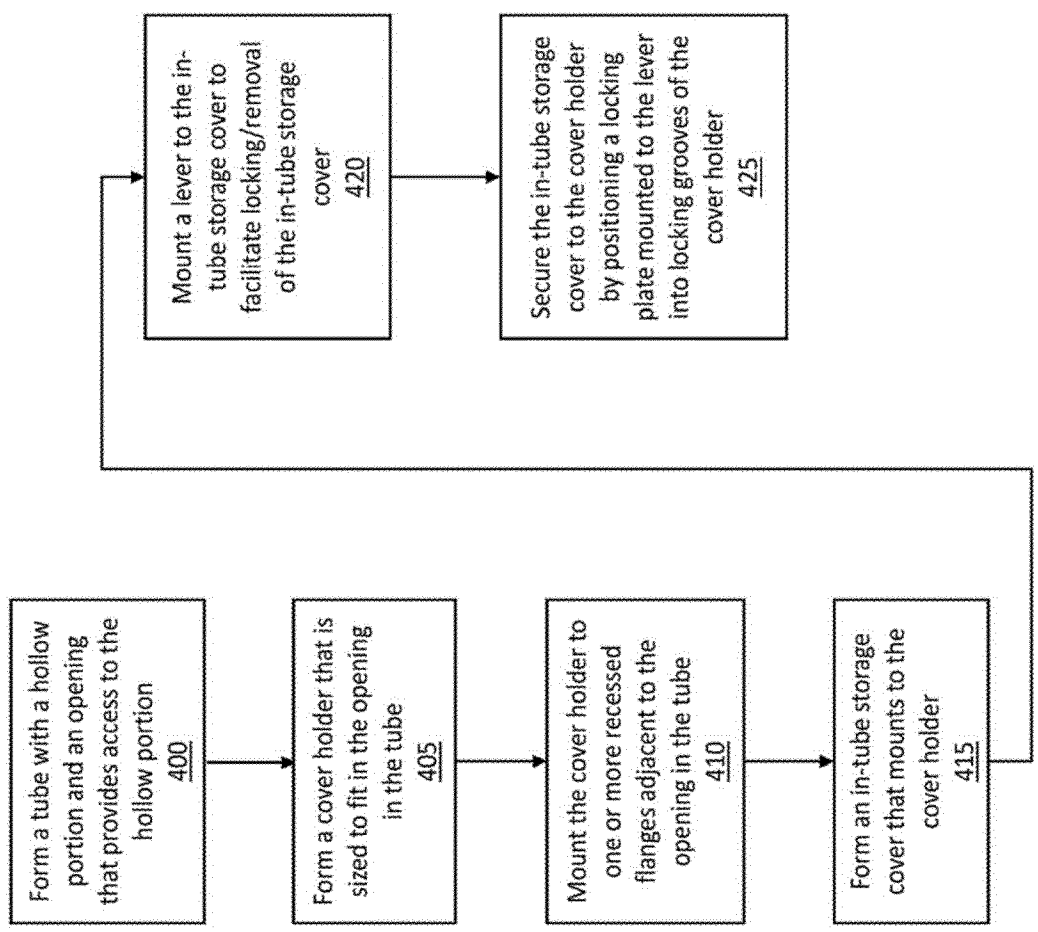

What is claimed is:

1. A bicycle frame, comprising:
    a tube with a hollow portion, wherein the tube includes an opening that provides access to the hollow portion, and wherein the tube also includes one or more recessed flanges adjacent to the opening;
    a cover holder configured to mount to the one or more recessed flanges adjacent to the opening in the tube;
    an in-tube storage cover that mounts to the cover holder such that at least a portion of an exterior surface of the in-tube storage cover is flush with an outer surface of the tube; and
    a lever mounted on the exterior surface of the in-tube storage cover to facilitate removal and locking of the in-tube storage cover.

2. The bicycle frame of claim 1, further comprising a locking plate mounted to the lever such that the locking plate rotates in unison with the lever.

3. The bicycle frame of claim 2, wherein the locking plate is mounted to the lever by way of a post that extends through the in-tube storage cover.

4. The bicycle frame of claim 2, wherein the cover holder includes a pair of locking slots, and wherein each locking slot is configured to receive an edge of the locking plate to secure the in-tube storage cover to the cover holder.

5. The bicycle frame of claim 4, wherein each locking slot includes a first portion and a second portion, wherein the first portion is wider than the second portion.

6. The bicycle frame of claim 5, wherein an upper wall of each locking slot includes a tapered portion that is a transition from the first portion to the second portion.

7. The bicycle frame of claim 4, wherein a bottom wall of each locking slot includes a locking tab that holds the edge of the locking plate via friction.

8. The bicycle frame of claim 1, wherein the exterior surface of the in-tube storage cover includes one or more inserts configured to receive a bicycle accessory.

9. The bicycle frame of claim 1, wherein the lever includes a flange to facilitate movement of the lever by a user.

10. The bicycle frame of claim 1, wherein the cover holder includes a first gasket configured to seal an interface between the cover holder and the in-tube storage cover and a second gasket configured to seal an interface between the cover holder and the one or more recessed flanges of the tube.

11. The bicycle frame of claim 1, further comprising a tool holder mounted to an interior surface of the in-tube storage cover, wherein the tool holder is configured to rest within the hollow portion of the tube and hold one or more tools.

12. The bicycle frame of claim 11, wherein the tool holder is mounted to the interior surface of the in-tube storage cover by way of one or more posts that extend from the interior surface of the in-tube storage cover to an upper surface of the tool holder.

13. The bicycle frame of claim 12, wherein the one or more posts form a gap between the interior surface of the in-tube storage cover and the upper surface of the tool holder to facilitate movement of a locking plate mounted to the lever.

14. The bicycle frame of claim 12, further comprising a prong mounted to the upper surface of the tool holder that mates with an angled flange on the interior surface of the in-tube storage cover to further secure the tool holder.

15. The bicycle frame of claim 1, wherein the tube comprises a down tube, and wherein the opening in the down tube is positioned on a top wall, a side wall, or a bottom wall of the down tube.

16. A method of making a bicycle frame, the method comprising:
    forming a tube for the bicycle frame such that the tube comprises a hollow portion and an opening that provides access to the hollow portion, and wherein forming the tube also comprises forming one or more recessed flanges adjacent to the opening;
    forming a cover holder that is sized to fit in the opening in the tube;
    mounting the cover holder to the one or more recessed flanges adjacent to the opening in the tube;
    forming an in-tube storage cover that mounts to the cover holder such that at least a portion of an exterior surface of the in-tube storage cover is flush with an outer surface of the tube; and
    mounting a lever on the exterior surface of the in-tube storage cover to facilitate removal and locking of the in-tube storage cover.

17. The method of claim 16, wherein forming the cover holder includes forming a pair of locking grooves in the cover holder, and further comprising mounting a locking plate to the lever such that the locking plate rotates in unison with the lever, wherein the pair of locking grooves are configured to receive edges of the locking plate when the in-tube storage cover is in a locked position.

18. A bicycle frame, comprising:
    a tube with a hollow portion, wherein the tube includes an opening that provides access to the hollow portion, and wherein the tube also includes one or more recessed flanges adjacent to the opening;
    a cover holder configured to mount to the one or more recessed flanges adjacent to the opening in the tube, wherein the cover holder includes one or more locking slots;
    an in-tube storage cover that mounts to the cover holder such that at least a portion of an exterior surface of the in-tube storage cover is flush with an outer surface of the tube; and
    a locking plate mounted to a post that extends through the in-tube storage cover, wherein the locking plate includes one or more edges that mate with the one or more locking slots in the cover holder to secure the in-tube storage cover to the tube.

19. The bicycle frame of claim 18, further comprising a lever mounted on the exterior surface of the in-tube storage cover to facilitate locking and removal of the in-tube storage cover, wherein the lever is mounted to the post that extends through the in-tube storage cover such that the locking plate moves in unison with the lever.

20. The bicycle frame of claim 18, wherein each of the one or more locking slots includes a first portion and a second portion, wherein the first portion is wider than the second portion, and wherein a bottom wall of each locking slot includes a locking tab that holds an edge of the locking plate via friction.

* * * * *

UNITED STATES PATENT AND TRADEMARK OFFICE
CERTIFICATE OF CORRECTION

| | | |
|---|---|---|
| PATENT NO. | : 11,511,824 B2 | |
| APPLICATION NO. | : 16/401211 | |
| DATED | : November 29, 2022 | |
| INVENTOR(S) | : Steven Moechnig et al. | |

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace Figs. 2A-2C and Figs. 3A-3F with Figs. 2A-2C and Figs. 3A-3F as shown on the attached corrected drawing pages.

Signed and Sealed this
Fourteenth Day of May, 2024

Katherine Kelly Vidal
*Director of the United States Patent and Trademark Office*

(12) United States Patent
Moechnig et al.

(10) Patent No.: US 11,511,824 B2
(45) Date of Patent: Nov. 29, 2022

(54) IN-TUBE CAVITY AND STORAGE

(71) Applicant: Trek Bicycle Corporation, Waterloo, WI (US)

(72) Inventors: Steven Moechnig, Madison, WI (US); Reggie Lund, Madison, WI (US); Matthew Yerke, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 848 days.

(21) Appl. No.: 16/401,211

(22) Filed: May 2, 2019

(65) Prior Publication Data
US 2020/0346708 A1 Nov. 5, 2020

(51) Int. Cl.
| | | |
|---|---|---|
| B62K 19/46 | (2006.01) | |
| B62K 19/06 | (2006.01) | |
| B62K 19/30 | (2006.01) | |
| B62J 9/40 | (2020.01) | |
| B62J 9/30 | (2020.01) | |
| B62K 3/02 | (2006.01) | |

(52) U.S. Cl.
CPC ............... B62K 19/46 (2013.01); B62J 9/30 (2020.02); B62J 9/40 (2020.02); B62K 19/06 (2013.01); B62K 19/30 (2013.01); B62K 3/02 (2013.01)

(58) Field of Classification Search
CPC . B62J 9/40; B62K 19/06; B62K 19/30; B62K 19/40
See application file for complete search history.

(56) References Cited

U.S. PATENT DOCUMENTS

| | | |
|---|---|---|
| 2,011,016 A | 8/1935 | Schwinn |
| 5,328,194 A | 7/1994 | Buckler |
| 6,070,897 A * | 6/2000 | Hsieh ................ B62J 9/40 74/564 |
| 6,851,499 B2 | 2/2005 | Yagisawa et al. |

(Continued)

FOREIGN PATENT DOCUMENTS

| | | |
|---|---|---|
| CN | 2608403 Y | 3/2004 |
| CN | 201105785 Y | 8/2008 |

(Continued)

OTHER PUBLICATIONS

Francis Cebedo, "Tech: Specialized SWAT Door Fram Storage" Mtbr.com, https //web.archive.org/web/20150516223751/https://reviews.mtbr.com/tech-specialized-swat-door, retrieved on Aug. 31, 2020.

(Continued)

*Primary Examiner* — Tony H Winner
*Assistant Examiner* — Michael R Stabley
(74) *Attorney, Agent, or Firm* — Bell & Manning, LLC

(57) ABSTRACT

A bicycle frame includes a tube with a hollow portion. The tube has an opening that provides access to the hollow portion, and the tube also includes one or more recessed flanges adjacent to the opening. The bicycle frame also includes a cover holder configured to mount to the one or more recessed flanges adjacent to the opening in the tube. The bicycle frame further includes an in-tube storage cover that mounts to the cover holder such that at least a portion of an exterior surface of the in-tube storage cover is flush with an outer surface of the tube. The in-tube storage cover includes a lever mounted on the exterior surface of the in-tube storage cover.

20 Claims, 8 Drawing Sheets